Patented Dec. 13, 1927.

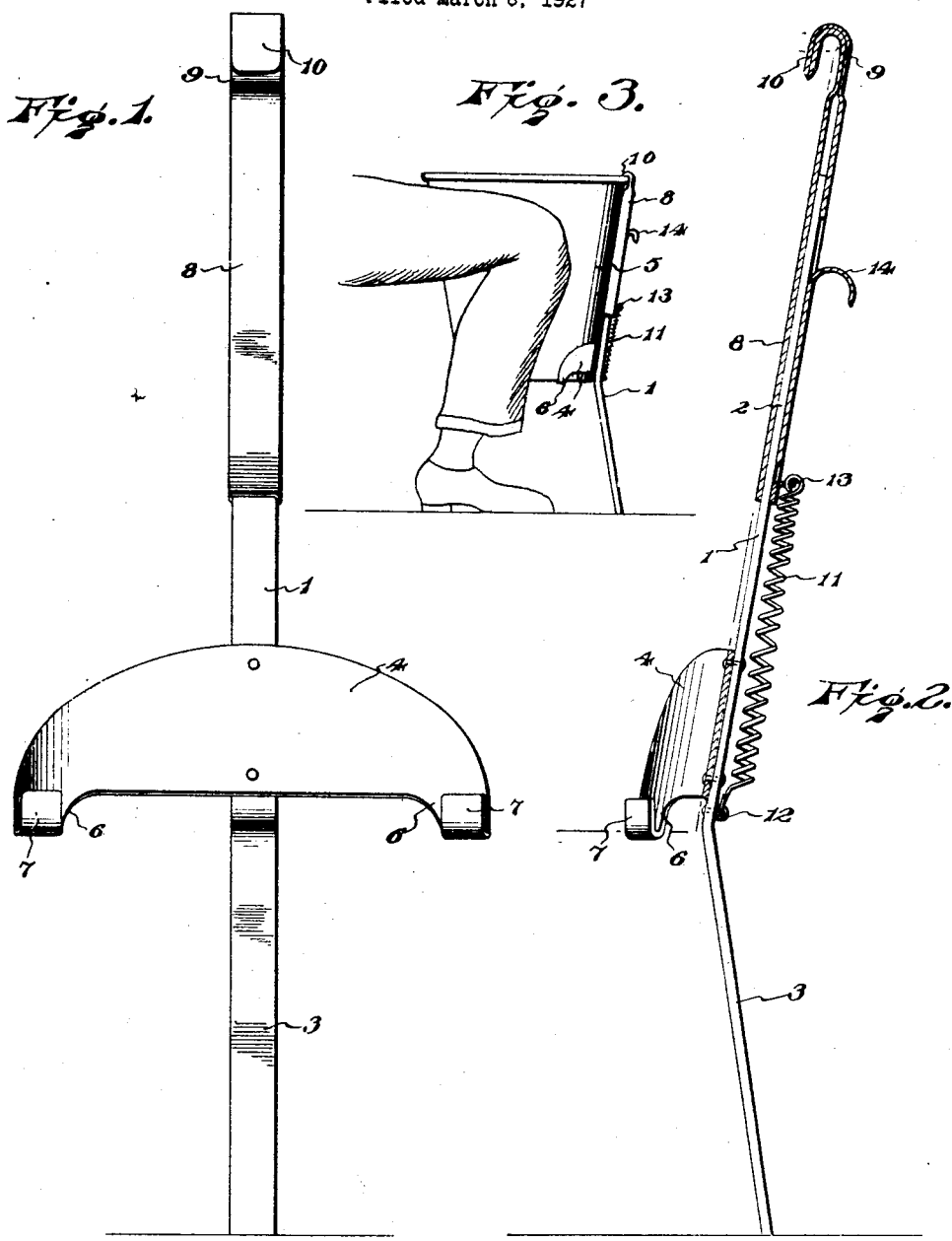

1,652,586

UNITED STATES PATENT OFFICE.

EDGAR F. SCHUELKE, OF ALTA, IOWA.

MILK-PAIL SUPPORT.

Application filed March 8, 1927. Serial No. 173,710.

This invention relates to a pail attachment and more particularly to a milk pail support. When a dairyman is milking by hand, it is customary to grip the pail between the knees with the pail tilted forwardly a slight extent so that it will be supported at the proper height and angle. As the pail is filled, it becomes heavy and must be tightly gripped in order to prevent it from slipping and falling upon the ground with resulting waste of the milk. Gripping the pail between the knees causes muscular strain which is tiring and it is, therefore, one object of the invention to provide a support which may be applied to a milk pail and rest upon the ground thereby supporting the weight of the pail and making it only necessary for the operator to steady the pail between his knees and prevent it from tipping over.

Another object of the invention is to provide a milk pail support which may be very easily applied to or removed from a pail and which will be firmly held in engagement with the pail when in use.

Another object of the invention is to so construct the pail support that it can be applied to pails of different sizes and accommodate itself to the size of pail to which it is applied.

The invention is illustrated in the accompanying drawing, wherein

Figure 1 is a view showing the improved pail support in front elevation;

Fig. 2 is a longitudinal sectional view through the pail support, and

Fig. 3 is a side elevation showing the support applied to a pail and the pail held between the knees of an operator.

The improved pail holder includes a prop 1 formed of metal and bent intermediate its ends to provide an upper portion 2 and a lower portion 3 which diverges downwardly and forwardly from the lower end of the upper section. The bar or strip from which the prop is formed is preferably rectangular in cross section and of sufficient thickness to provide a rigid prop. Adjacent the lower end of the upper section 2, the prop carries a cross arm 4 which is formed from strong sheet metal and is curved longitudinally to conform to the contour of the walls of a milk pail 5. At its ends the cross arm is provided with depending tongues 6 having their lower free ends bent upwardly to provide hooks 7 intended to engage beneath the lower edge or bottom of the milk pail. Therefore, the milk pail will be very well supported and prevented from tilting transversely of the prop.

In order to engage the upper edge of the milk pail wall, there has been provided a tube or sleeve 8 which is also formed of metal and slidably fits upon the prop with its upper portion extending above the prop, as shown in Fig. 2. By referring to Fig. 2, it will be seen that the projecting upper end portion of the tube 8 is flattened, as shown at 9, and bent back upon itself to form a hook 10 adapted to engage over the upper edge of the milk pail. Therefore, the pail will be firmly gripped at its upper and lower edges and the support will be prevented from slipping out of proper engagement with the pail when applied to it. In order to yieldably resist upward movement of the sleeve 8, there has been provided a spring 11 which extends longitudinally of the prop with its lower end engaged with an eye 12 carried by the prop adjacent the intersection of the upper and lower sections thereof. The upper end of the spring is engaged in an opening formed in a tongue 13 cut from the sleeve and bent outwardly and downwardly. A longer tongue 14 is cut from the sleeve above the tongue 13 and bent outwardly and downwardly to form a finger hold by means of which the tube or sleeve may be very easily slid upwardly upon the prop against the action of the spring 11. By this arrangement the hooks 7 may be engaged beneath the lower edge of the pail and the tongue 14 grasped and the sleeve 8 moved upwardly a sufficient distance to allow the hook 10 to engage over the upper edge of the pail. When the hook 10 is engaged over the upper edge of the pail, the tongue 14 is released and the spring will draw the sleeve downwardly until the hook is firmly engaged with the upper edge of the pail. A milk pail having one of these supports applied to it may be placed between the knees and since the lower end of the prop rests upon the ground it will sustain the weight of the pail and the operator will only have to steady the pail and prevent it from tilting transversely while milking. Therefore, it will not be necessary for him to grip the pail and muscular strain and liability of a pail slipping with consequent loss of milk will be avoided. When the pail is filled with milk, the support may be easily removed by grasping the tongue 14 and moving the sleeve upwardly a sufficient distance to disengage the hook 10 from the upper edge of the pail.

Having thus described the invention, I claim:

1. A pail holder comprising a ground-engaging prop, means carried thereby for engaging beneath a pail, means for engaging over the upper edge of a pail carried by said prop and slidable longitudinally thereon, and yieldable means engaged with said prop and the slidable pail-engaging means to resist upward movement thereof.

2. A pail holder comprising a ground-engaging prop, means carried thereby for engaging beneath a pail, a sleeve slidable longitudinally upon said prop with its upper end portion extending above the prop and provided with a hook for engaging over the upper edge of a pail, and a spring having one end engaged with said prop and its other end engaged with said sleeve and yieldably resisting upward movement of the sleeve.

3. A pail holder comprising a ground-engaging prop, means carried thereby for engaging beneath a pail, a sleeve slidable longitudinally upon said prop with its upper end portion extending above the prop and provided with a hook for engaging over the upper edge of a pail, a tongue carried by said sleeve and bent outwardly and downwardly to form an actuating element for the sleeve, a second tongue carried by said sleeve adjacent its lower end and extending outwardly therefrom, an eye carried by said prop below said sleeve, and a spring extending longitudinally of the prop with its lower end engaged with said eye and its upper end engaged with the lower tongue of said sleeve and yieldably resisting upward movement of the sleeve.

4. A pail holder comprising a ground-engaging prop, a cross arm carried by said prop intermediate its ends, said cross arm being curved longitudinally and at its ends provided with hooks to engage beneath a pail, a sleeve slidable upon the upper portion of said prop with its upper end portion extending above the prop and provided with a hook to engage over the upper edge of a pail, and a spring extending longitudinally of the prop with its lower end engaged with the prop and its upper end engaged with said sleeve and yieldably resisting upward movement of the sleeve.

In testimony whereof I affix my signature.

EDGAR F. SCHUELKE. [L. S.]